US012083387B1

(12) United States Patent
Chavan et al.

(10) Patent No.: US 12,083,387 B1
(45) Date of Patent: Sep. 10, 2024

(54) HIGH ELONGATION GOLF BALL COATING

(71) Applicant: Topgolf Callaway Brands Corp., Carlsbad, CA (US)

(72) Inventors: Vijay Chavan, Oceanside, CA (US); Steve Mautte, Carlsbad, CA (US)

(73) Assignee: Topgolf Callaway Brands Corp., Carlsbad, CA (US)

( * ) Notice: Subject to any disclaimer, the term of this patent is extended or adjusted under 35 U.S.C. 154(b) by 5 days.

(21) Appl. No.: 18/109,775

(22) Filed: Feb. 14, 2023

Related U.S. Application Data

(60) Provisional application No. 63/318,891, filed on Mar. 11, 2022, provisional application No. 63/313,397, filed on Feb. 24, 2022.

(51) Int. Cl.
*A63B 37/12* (2006.01)
*A63B 37/00* (2006.01)
*C09D 175/04* (2006.01)

(52) U.S. Cl.
CPC ...... *A63B 37/00221* (2020.08); *C09D 175/04* (2013.01); *A63B 37/0074* (2013.01); *A63B 37/0075* (2013.01); *A63B 37/0076* (2013.01)

(58) Field of Classification Search
CPC .................................................. A63B 37/0022
See application file for complete search history.

(56) References Cited

U.S. PATENT DOCUMENTS

| | | | | |
|---|---|---|---|---|
| 4,141,559 A * | 2/1979 | Melvin | ............... | A63B 37/0021 473/379 |
| 4,147,679 A * | 4/1979 | Scriven | ................ | C09D 175/04 442/104 |
| 4,264,075 A * | 4/1981 | Miller | ................ | A63B 37/0003 525/274 |
| 4,567,228 A * | 1/1986 | Gaa | ..................... | C08G 18/3893 524/588 |
| 4,582,873 A * | 4/1986 | Gaa | ...................... | C08G 18/289 428/447 |
| 5,048,838 A * | 9/1991 | Chikaraishi | ........ | A63B 37/0051 473/373 |
| 5,086,110 A * | 2/1992 | Xiao | ...................... | C08G 18/73 528/83 |
| 5,459,220 A * | 10/1995 | Kennedy | .......... | A63B 37/00222 473/378 |
| 5,482,285 A * | 1/1996 | Yabuki | ............... | A63B 37/0003 473/373 |
| 5,494,291 A * | 2/1996 | Kennedy | .................. | C08K 5/20 473/378 |
| 5,820,491 A * | 10/1998 | Hatch | ................ | A63B 37/0003 473/378 |
| 6,155,569 A | 12/2000 | Horiuchi et al. | | |
| 6,210,758 B1 * | 4/2001 | McNeil | .................... | B05D 7/58 427/409 |

(Continued)

OTHER PUBLICATIONS

Lanxess, Witcobond 460-64 data sheet Aug. 12, 2020.
Sika Materaial Data Sheet, Crosslinker CX-100, May 2012.

*Primary Examiner* — Alvin A Hunter

(74) *Attorney, Agent, or Firm* — Michael A. Catania

(57) ABSTRACT

A high elongation golf ball coating is disclosed herein. The coating preferably comprises a one-component polyurethane dispersion (PUD). The coating has an elongation of at least 400 percent. The PUD preferably consists of 20% to 40% weight solids dispersions of polyurethane-filled micelles in a continuous water phase.

18 Claims, 17 Drawing Sheets

(56) References Cited

U.S. PATENT DOCUMENTS

| | | |
|---|---|---|
| 6,284,835 B1 | 9/2001 | Ellison |
| 6,284,836 B1* | 9/2001 | Hassel ............... C08G 18/4854 524/591 |
| 6,340,503 B1* | 1/2002 | Simonds ................ A63B 37/12 525/453 |
| 6,342,558 B1* | 1/2002 | Grandhee ............ C09D 175/04 524/507 |
| 6,395,861 B1* | 5/2002 | Kennedy, III ......... A63B 37/12 528/80 |
| 6,437,036 B1* | 8/2002 | Gessner ............... C09D 175/04 524/832 |
| 6,514,572 B1* | 2/2003 | Koonce ................. C08G 18/12 427/372.2 |
| 6,635,723 B1* | 10/2003 | Maier ................ C04B 41/4884 524/591 |
| 6,780,127 B2* | 8/2004 | Kennedy, III ..... A63B 37/0003 473/378 |
| 6,943,213 B2* | 9/2005 | Kuntimaddi ....... C08G 18/6225 473/378 |
| 6,986,719 B2* | 1/2006 | Kennedy, III ..... A63B 37/0003 473/378 |
| 7,485,052 B2 | 2/2009 | Matroni et al. |
| 8,716,402 B2* | 5/2014 | Temple ............. C08G 18/4222 524/591 |
| 8,920,264 B2* | 12/2014 | Kennedy, III ..... A63B 37/0092 473/378 |
| 8,936,517 B2 | 1/2015 | Dee et al. |
| 9,149,685 B2* | 10/2015 | Kennedy, III ..... A63B 37/0027 |
| 9,283,438 B2* | 3/2016 | Ladd ................. A63B 37/0074 |
| 9,566,474 B2* | 2/2017 | Yontz .................. C09D 175/04 |
| 9,731,167 B2 | 8/2017 | Tachibana et al. |
| 9,744,408 B2 | 8/2017 | Kamino et al. |
| 9,962,577 B1 | 5/2018 | Chavan |
| 9,975,005 B2 | 5/2018 | Tachibana et al. |
| 9,988,555 B2* | 6/2018 | Erdodi ................ C08G 18/603 |
| 10,010,762 B2 | 7/2018 | Tarao et al. |
| 10,201,731 B2 | 2/2019 | Mimura et al. |
| 10,392,467 B2* | 8/2019 | Ciaccio ................ C25D 13/20 |
| 10,463,920 B2 | 11/2019 | Inoue et al. |
| 10,525,310 B2 | 1/2020 | Tanaka et al. |
| 10,610,740 B2 | 4/2020 | Hayahsi |
| 10,640,616 B2* | 5/2020 | Erdodi ................. C09J 175/12 |
| 10,722,755 B1 | 7/2020 | Chavan |
| 10,752,806 B2* | 8/2020 | Bowman ................ C08L 75/08 |
| 10,874,908 B2 | 12/2020 | Tanaka et al. |
| 11,130,869 B2* | 9/2021 | Erdodi ................. C08G 69/48 |
| 2013/0210553 A1* | 8/2013 | Molinari ............ A63B 37/0033 473/378 |

* cited by examiner

HIGH ELONGATION GOLF BALL COATING

CROSS REFERENCES TO RELATED APPLICATIONS

The Present Application claims priority to U.S. Provisional Patent Application No. 63/313,394, filed on Feb. 24, 2022, and U.S. Provisional Patent Application No. 63/318,891, filed on Mar. 11, 2022, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to coatings for golf balls.

Description of the Related Art

Chavan et al., U.S. patent Ser. No. 10/722,755, for a Graphene Based Golf Ball Coating, discloses a coating infused with graphene.

Chavan et al., U.S. Pat. No. 9,962,577, for a Soft Polyurethane Coating For A Golf Ball, discloses a coating based on a polyol mixture containing acrylic polyol and BEPD based caprolactone polyol.

The prior art fails to disclose a suitable coating for a golf ball.

BRIEF SUMMARY OF THE INVENTION

One aspect of the present invention is a golf ball comprising a core, a cover layer disposed over the core, and a coating disposed over the cover layer. The coating comprises a one-component polyurethane dispersion (PUD). The coating has an elongation of at least 400 percent.

Another aspect of the present invention is a golf ball comprising a core, a mantle layer, a cover layer disposed over the mantle layer, and a coating disposed over the cover layer. The coating comprises a one-component polyurethane dispersion (PUD). The coating has an elongation of at least 400 percent.

The PUD preferably consists of 20% to 40% weight solids dispersions of polyurethane-filled micelles in a continuous water phase. The cover layer is preferably composed of an ionomer material. The weight solid dispersions preferably has a particle of size of no more than 0.0642 microns. The coating preferably has a viscosity of at least 200 cp. The coating is preferably a primer layer. The golf ball further comprises a base coat and a top coat. The coating is preferably water based. Alternatively, the coating is solvent based. Alternatively, the coating has six layers.

Yet another aspect of the present invention is a coating for a golf ball. The coating comprises a one-component polyurethane dispersion (PUD). The coating has an elongation of at least 400 percent. The PUD preferably consists of 20% to 40% weight solids dispersions of polyurethane-filled micelles in a continuous water phase. The weight solid dispersions preferably has a particle of size of no more than 0.0642 microns. The coating preferably has a viscosity of at least 200 cp.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

A main purpose of the present invention is to increase short game spin on golf balls by modifying coating properties and construction without affecting other club performance through the bag. The desired improvement is achieved by applying an extremely soft primer layer for the ball coating.

The utilization of a higher elongation ball coating to improve short game back spin and ball durability is shown in FIGS. 20-23A.

Figure 20:
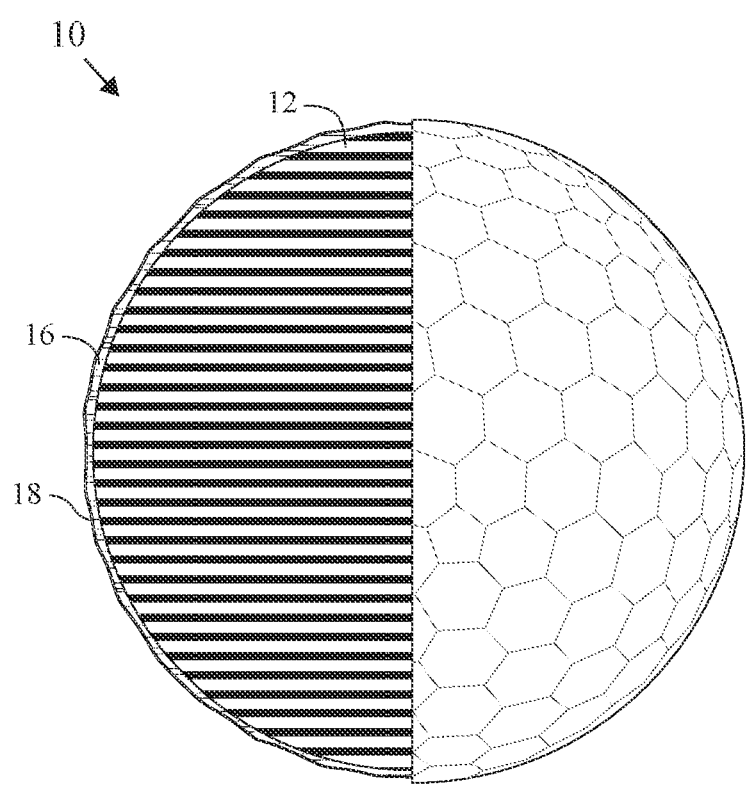
FIG. 20 is a cross-sectional view of a two-piece golf ball with a core, and a cover with a coating over the cover.

FIG. 20 illustrates a two piece golf ball 10 comprising a core 12 and a cover 16 with a coating layer 18.

Figure 21:
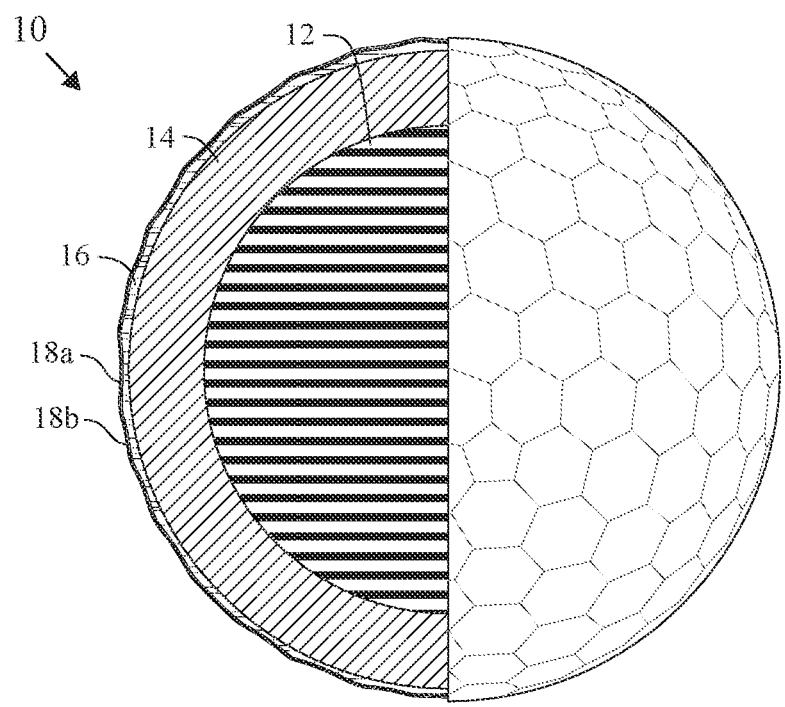
FIG. 21 is a cross-sectional view of a three-piece golf ball with a core, a mantle layer, and a cover with two coatings over the cover.

In another embodiment of the present invention, FIG. 21 illustrates a three piece golf ball 10 comprising a core 12, a mantle layer 14, and a cover 16 with two coating layers 18a and 18b.

Figure 22:
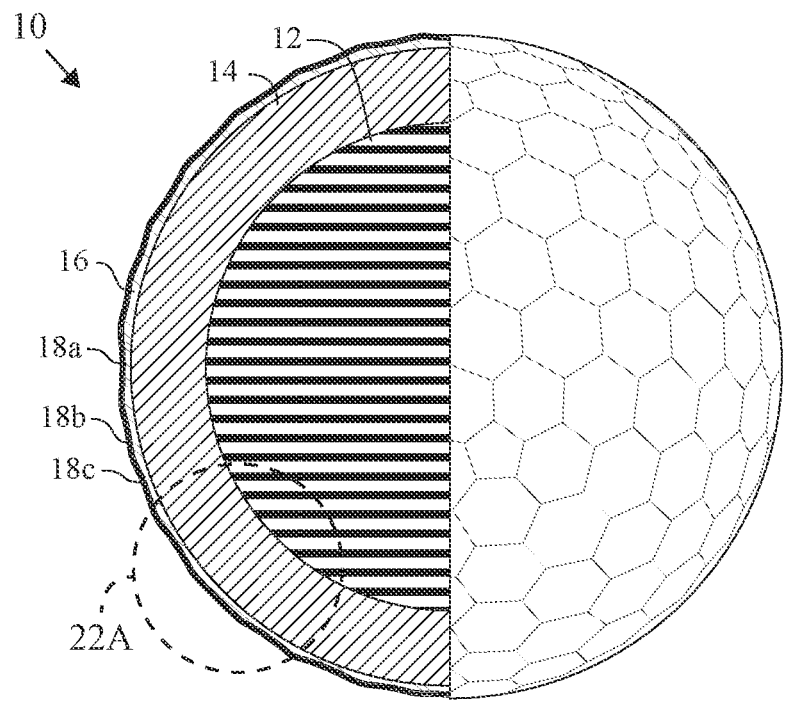
FIG. 22 is a cross-sectional view of a three-piece golf ball with a core, a mantle layer, and a cover with three coatings over the cover.
Figure 22A:
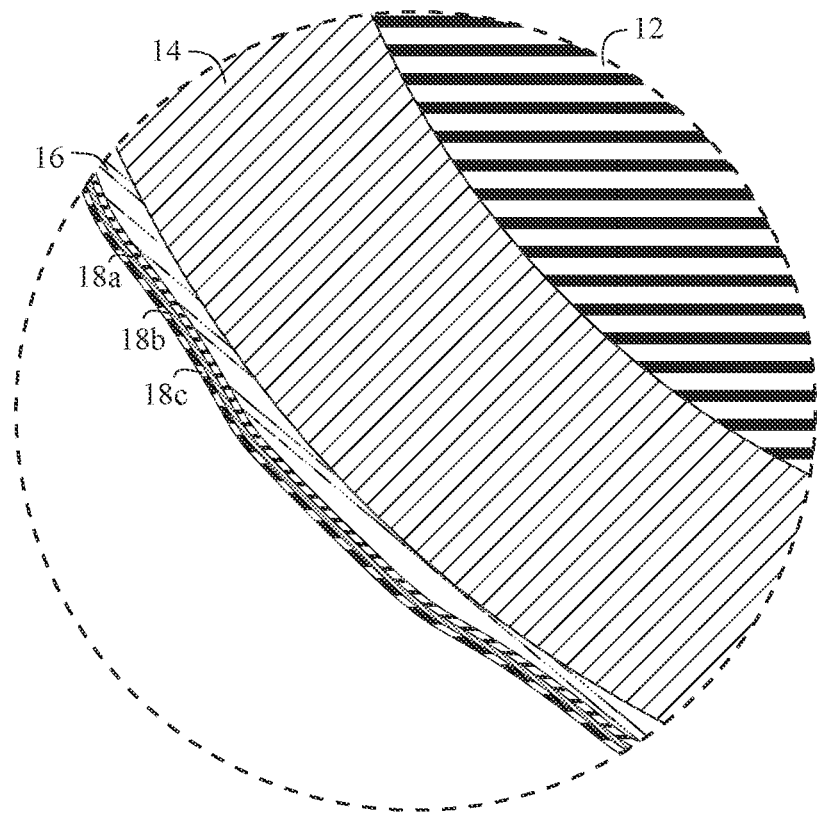
FIG. 22A is a cross-sectional detailed view of FIG. 22.

In another embodiment of the present invention, FIG. 22 and FIG. 22A illustrate a three piece golf ball 10 comprising a core 12, a mantle layer 14, and a cover 16 with three coating layers 18a, 18b, and 18c.

Figure 23:
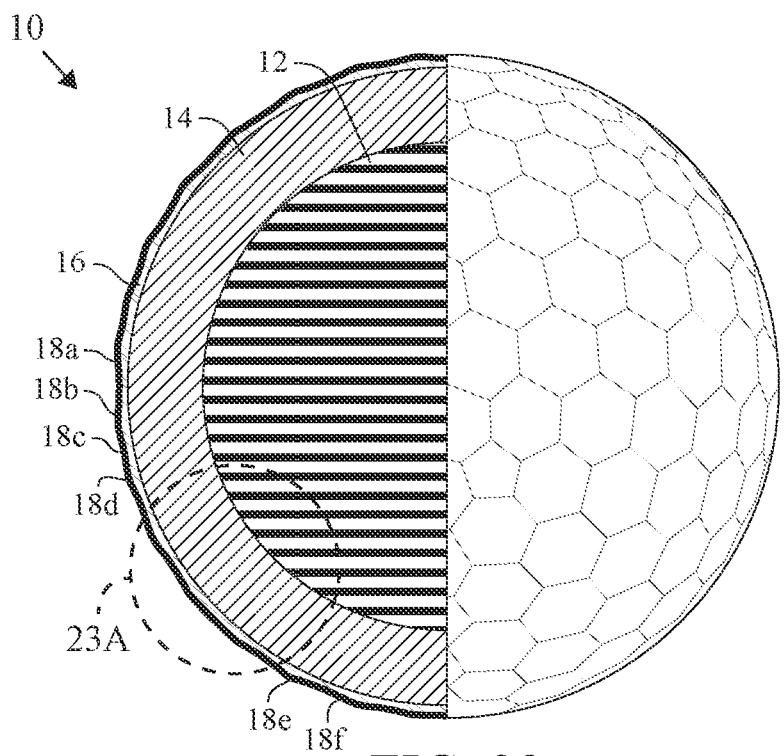
FIG. 23 is a cross-sectional view of a three-piece golf ball with a core, a mantle layer, and a cover with six coatings over the cover.
Figure 23A:
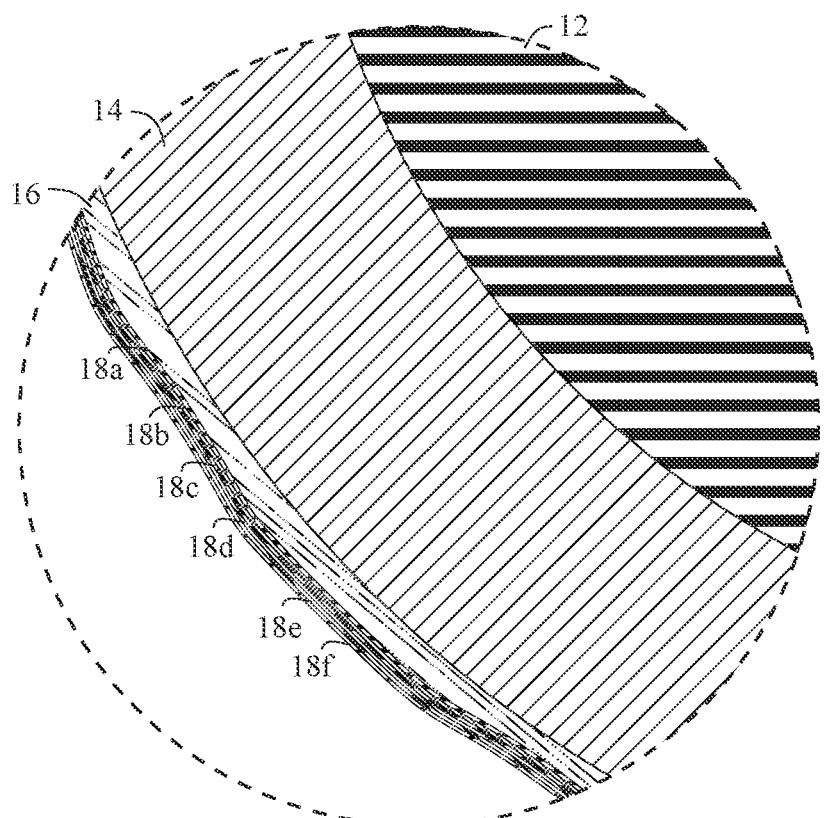
FIG. 23A is a cross-sectional detailed view of FIG. 23.

In another embodiment of the present invention, FIG. 23 and FIG. 23A illustrate a three piece golf ball 10 comprising a core 12, a mantle layer 14, and a cover 16 with six coating layers 18a, 18b, 18c, 18d, 18e, and 18f.

The coating comprises a one-component polyurethane dispersion (PUD). The coating preferably has an elongation of at least 400 percent.

Using the PUD polyurethane primer gives the ability to cure on Ionomer cover stock. It can be applied by conventional HVLP (high volume-low pressure) spray coating.

The PUD preferably consists of 20% to 40% weight solids dispersions of polyurethane-filled micelles in a continuous water phase. The cover layer is preferably composed of an ionomer material. The weight solid dispersions preferably has a particle of size of no more than 0.0642 microns. The coating preferably has a viscosity of at least 200 cp. The coating is preferably a primer layer. The golf ball further comprises a base coat and a top coat. The coating is preferably water based. Alternatively, the coating is solvent based. Alternatively, the coating has six layers.

Player testing was performed with these versions and all testers noted this back spin/shot check improvement over the control ball. Multiple other versions were also investigated, showing a consistent improvement of back spin in a three-piece ionomer cover construction without sacrificing the rest of the ball properties.

As can be seen from testing, it is beneficial to utilize the high elongation coating in multiple configurations as to be able to fine-tune process and performance. Improvements are seen in the following: High elongation coatings with elongation of 400% and above; Primers that are both water-based and solvent-based (for non-ionomer covers); and Coating configurations that include anything between a single layer of the high-elongation compound, a single layer of it in combination with non-high elongation layers, and configuration that layer the high-elongation compound at least up to six layers.

Additionally, the high-elongation primer yielded improved barrel durability results, due to the higher elongation/higher tensile strength of the material.

The composition of the current high elongation resin being tested is an aqueous polyurethane dispersion (PUD) with no free isocyanate. Another resin is an aliphatic polycarbonateester-polyether polyurethane dispersion (Impranil DLU).

Water based coating includes the following polymers, but is not limited to, polyurethane dispersion, emulsion, 2 part water based epoxy, 1-part alkyd. Polyurethane dispersion can be made from polyester or polyether polyols. Emulsion used can be based on a family of acrylic monomers such as methyl methacrylate, acrylic acid, methacrylic acid, n-butyl acrylate, t-butyl acrylate, 2-ethyl hexyl acrylate, n-butyl methacrylate, t-butyl methacrylate, styrene.

Solvent based coating includes but is not limited to 2-part polyurethane, 2-part epoxy, 1-part alkyd, 2-part polyurea, 1-part moisture cure silicone, 2-part moisture cure silicone, 2-part platinum cure silicone. Silicone coating may or may not contain any solvent i.e. 100% solids.

FIGS. 1, 3, 4 and 5 illustrate a five piece golf ball 10 comprising an inner core 12a, an outer core 12b, an inner mantle 14a, an outer mantle 14b, and a cover 16.

Figure 1:
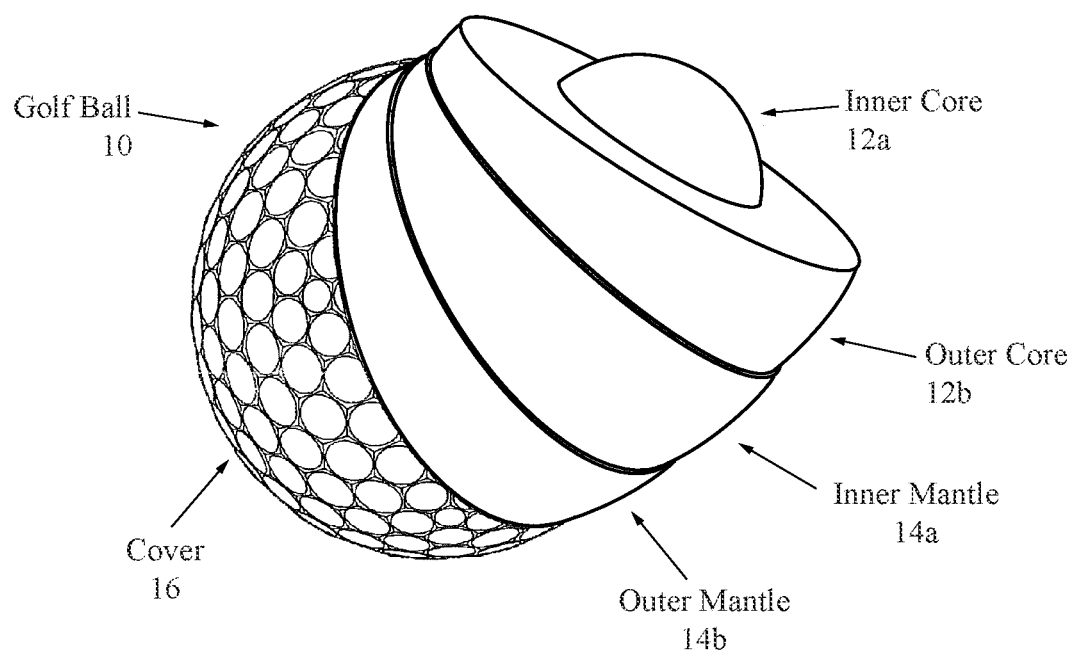
FIG. 1 is an exploded partial cut-away view of a golf ball.
Figure 2:
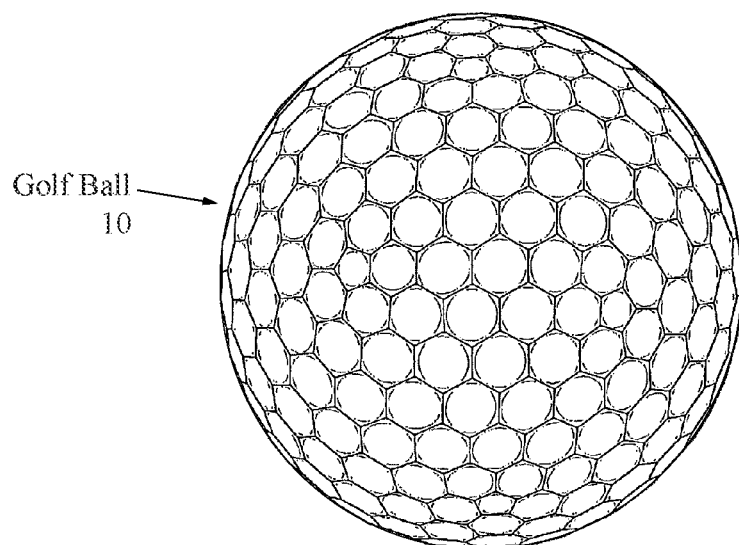
FIG. 2 is top perspective view of a golf ball.
Figure 3:
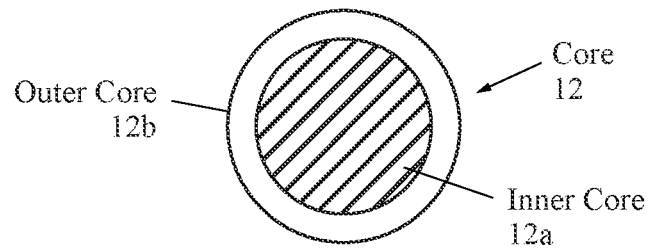
FIG. 3 is a cross-sectional view of a core component of a golf ball.
Figure 4:
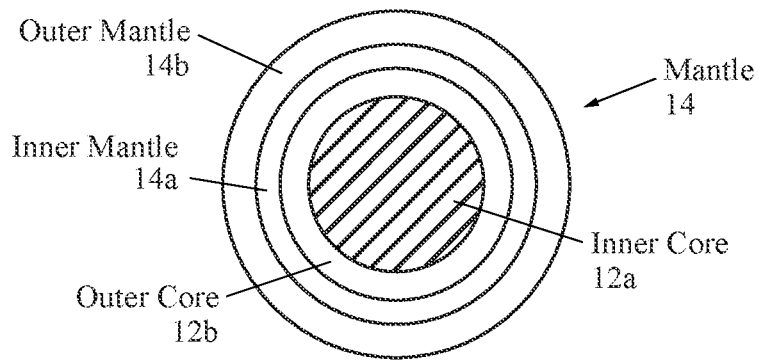
FIG. 4 is a cross-sectional view of a core component and a mantle component of a golf ball.
Figure 5:
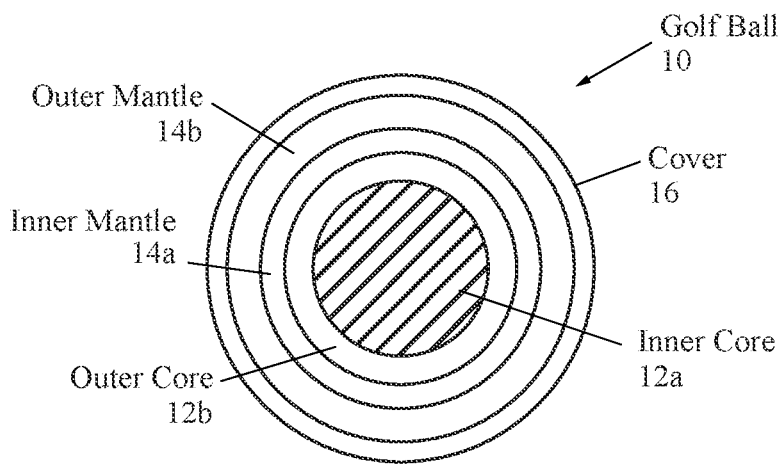
FIG. 5 is a cross-sectional view of an inner core layer, an outer core layer, an inner mantle layer, an outer mantle layer and a cover layer of a golf ball.
Figure 5A:
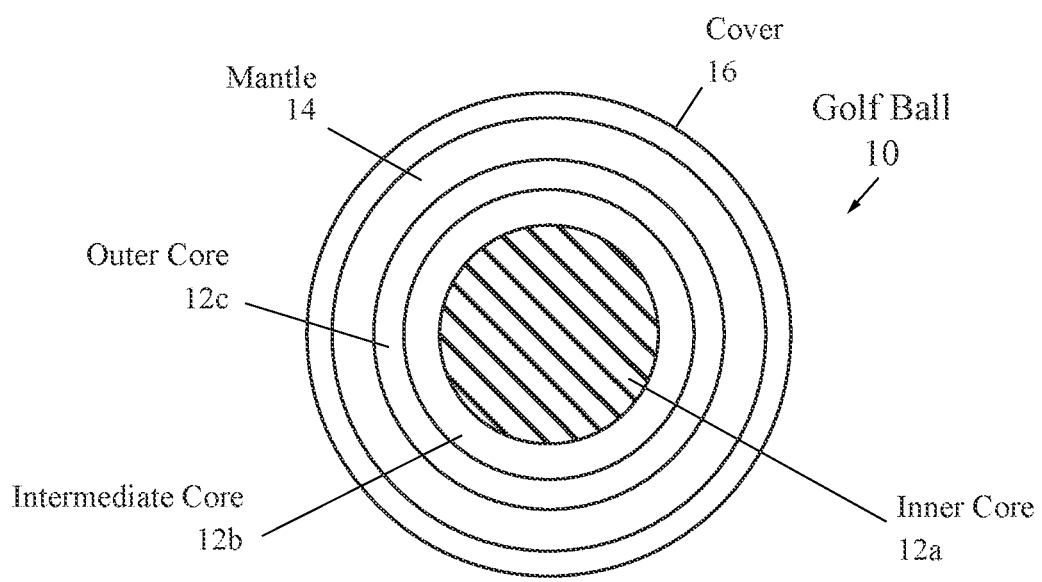
FIG. 5A is a cross-sectional view of an inner core layer, an intermediate core layer, an outer core layer, a mantle layer and a cover layer of a golf ball.

FIG. 5A illustrates a five piece golf ball 10 comprising an inner core 12a, an intermediate core 12b, an outer core 12c, a mantle 14, and a cover 16.

Figure 8:
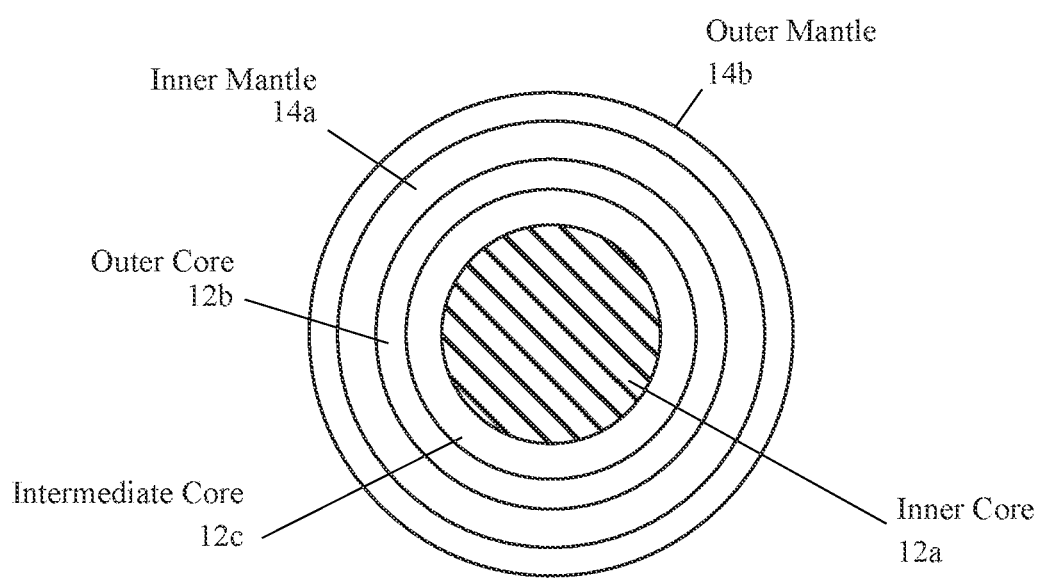
FIG. 8 is a cross-sectional view of a core component and a mantle component of a golf ball.
Figure 9:
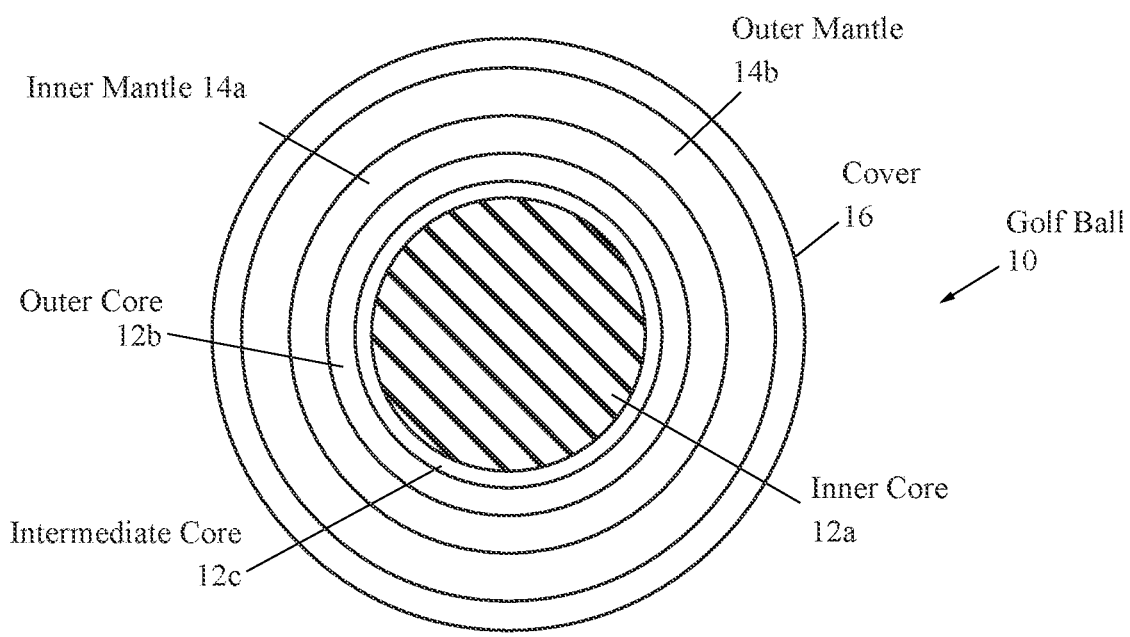
FIG. 9 is a cross-sectional view of a core component, the mantle component and a cover layer of a golf ball.

FIGS. 8 and 9 illustrate a six piece golf ball 10 comprising an inner core 12a, an intermediate core 12b, an outer core 12c, an inner mantle 14a, an outer mantle 14b, and a cover 16.

Figure 10:
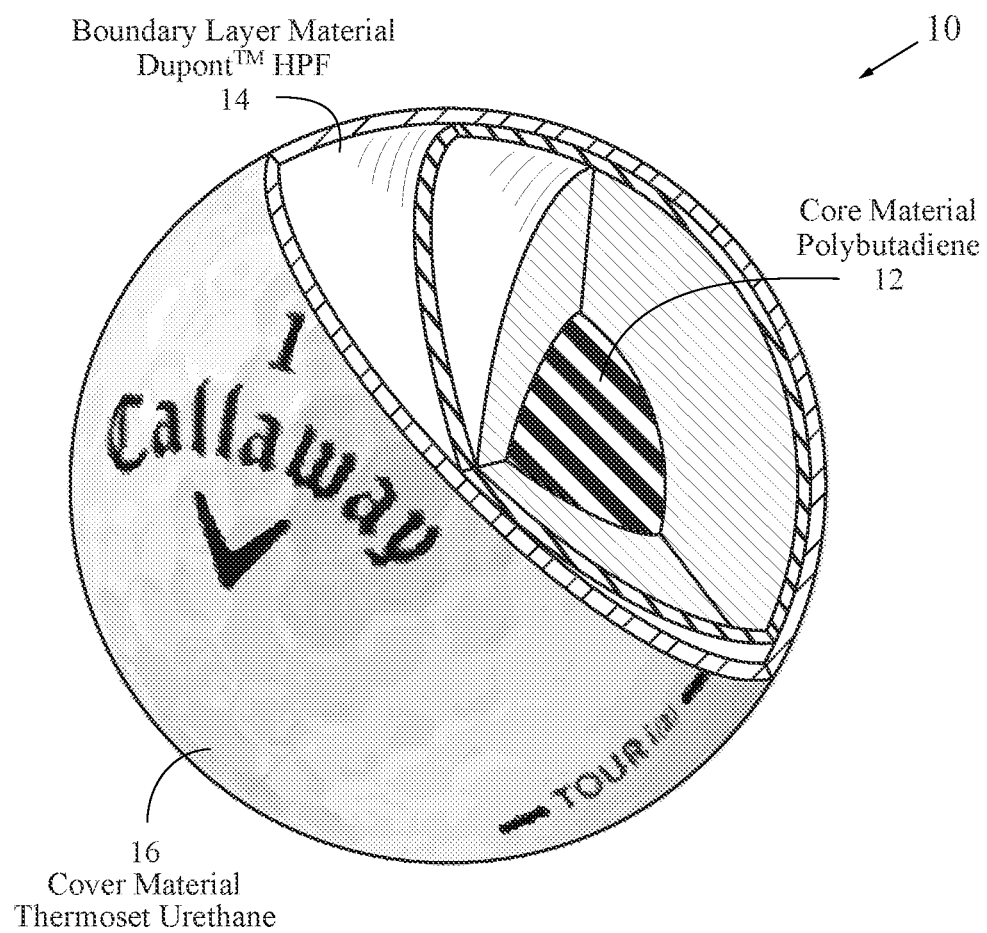
FIG. 10 is an exploded partial cut-away view of a four-piece golf ball.

FIG. 10 illustrates a four piece golf ball comprising a dual core, a boundary layer and a cover.

Figure 11:
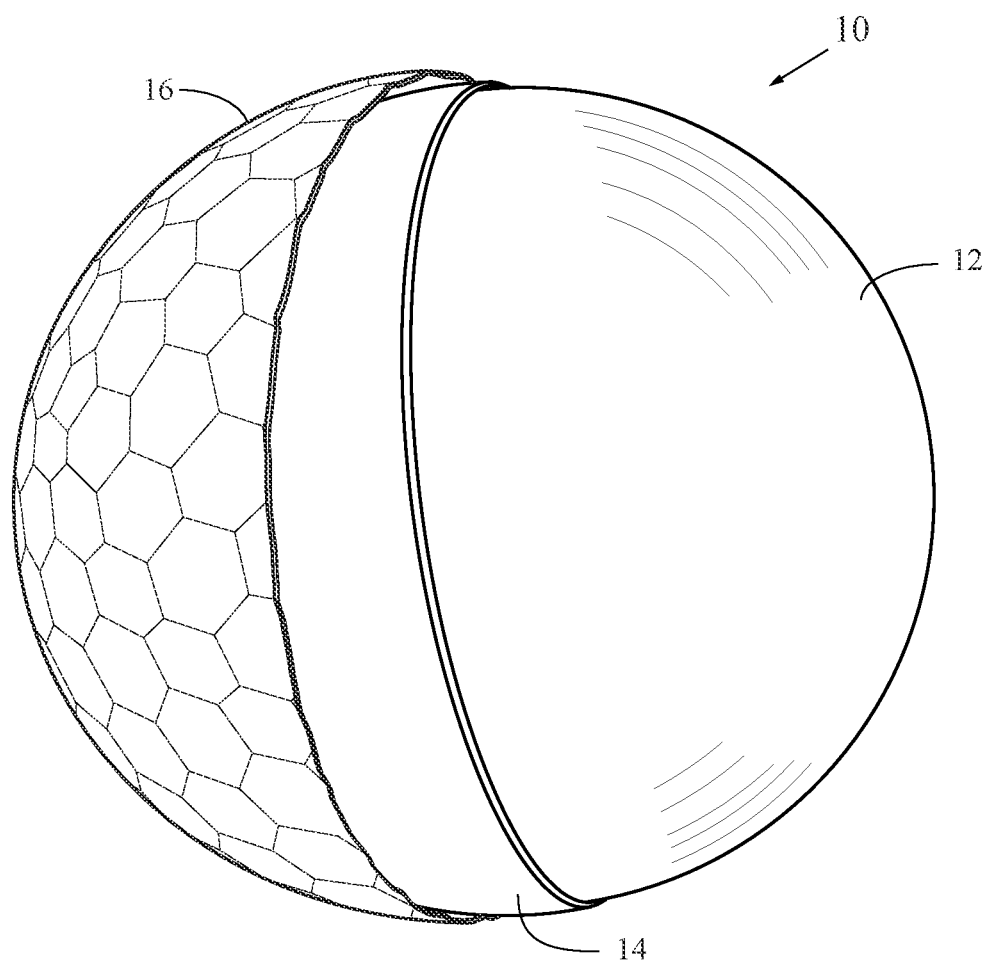
FIG. 11 is an exploded partial cut-away view of a three-piece golf ball.

FIG. 11 illustrates a three piece golf ball comprising a core, a boundary layer and a cover.

Figure 12:
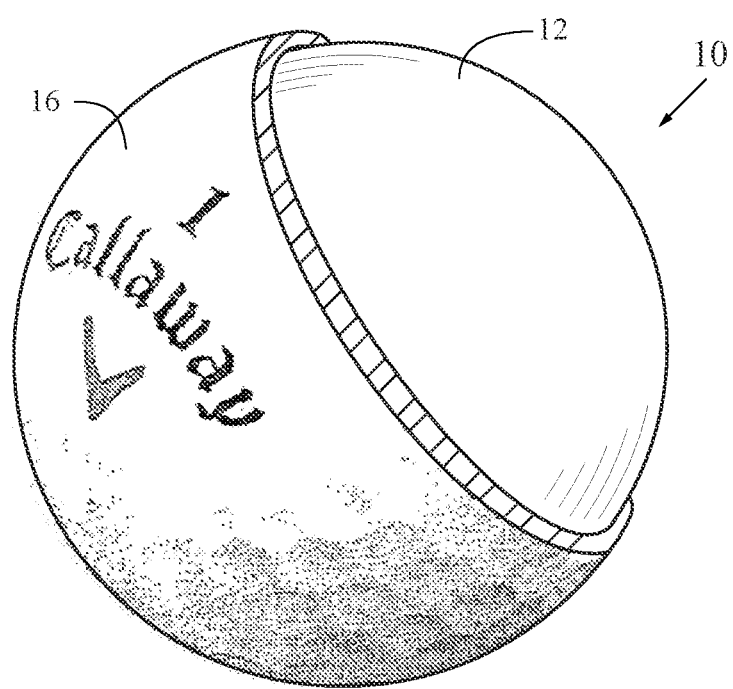
FIG. 12 is an exploded partial cut-away view of a two-piece golf ball.
Figure 13:
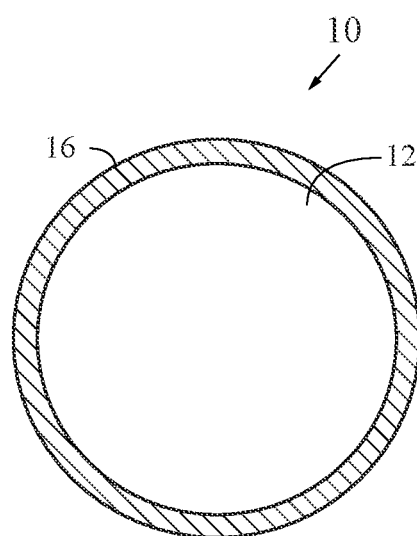
FIG. 13 is a cross-sectional view of a two-piece golf ball.

FIGS. 12 and 13 illustrate a two piece golf ball 20 with a core 25 and a cover 30.

Figure 14:
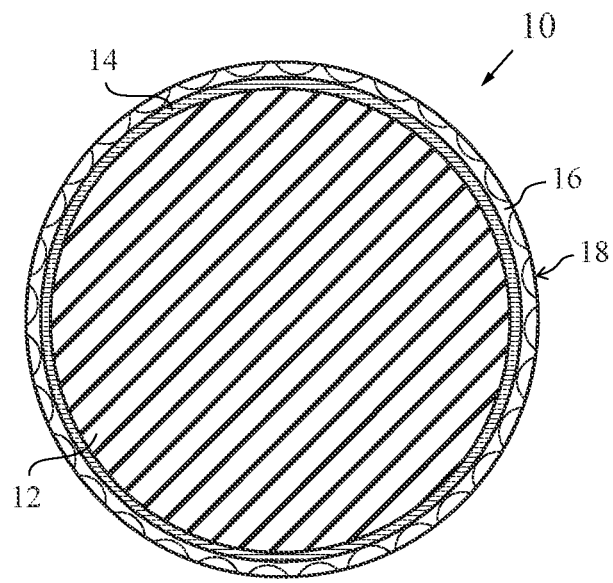
FIG. 14 is a cross-sectional view of a three-piece golf ball.
Figure 15:
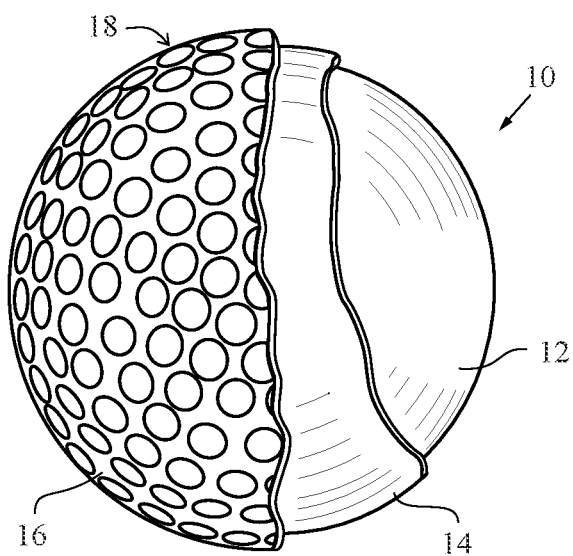
FIG. 15 is an exploded partial cut-away view of a three-piece golf ball.

FIGS. 14 and 15 illustrate a three-piece golf ball 5 comprising a core 10, a mantle layer 14 and a cover 16 with dimples 18.

Figure 16:
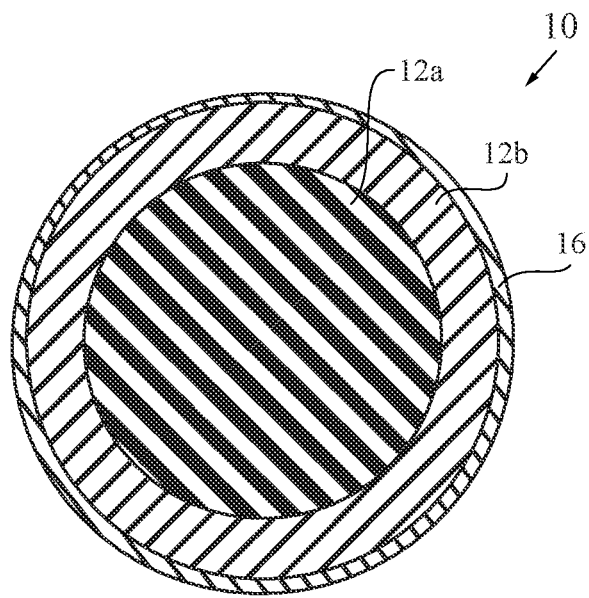
FIG. 16 is a cross-sectional view of a three-piece golf ball with a dual core and a cover.

FIG. 16 illustrates a dual core three piece golf ball 10 comprising an inner core 12a, and outer core 12b and a cover 16.

Figure 17:
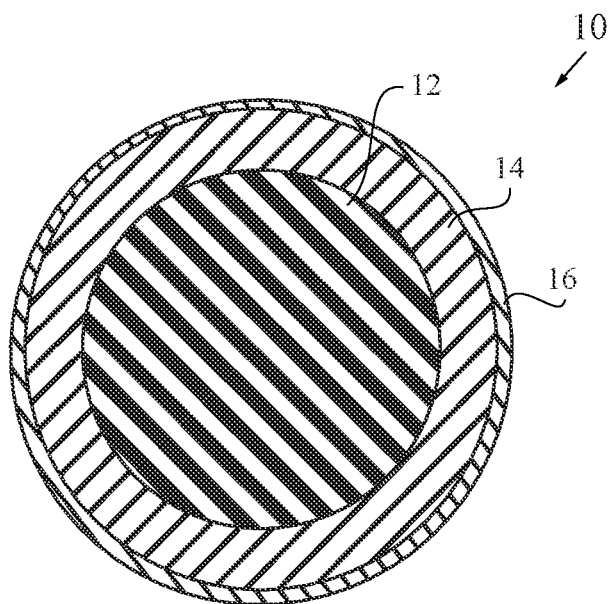
FIG. 17 is a cross-sectional view of a three-piece golf ball with a core, mantle and cover.

FIG. 17 illustrates a three piece golf ball 10 comprising a core 12, a mantle layer 14 and a cover 16.

Figure 18:
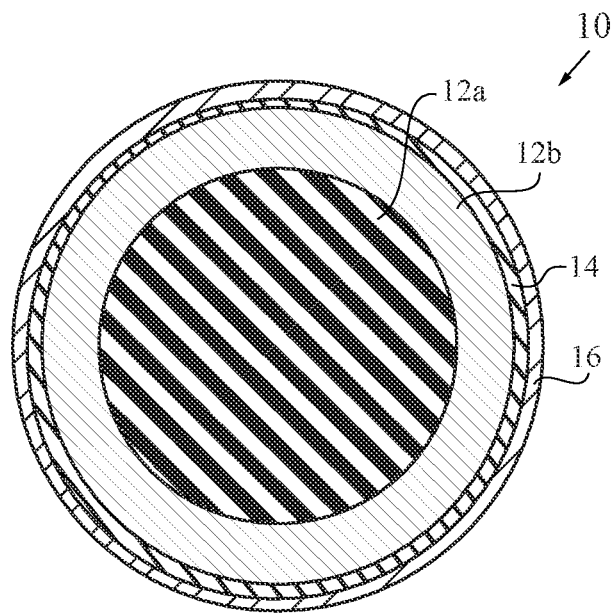
FIG. 18 is a cross-sectional view of a four-piece golf ball with a dual core, mantle layer and a cover.

FIG. 18 illustrates a dual core four piece golf ball 10 comprising an inner core 12a, an outer core 12b, a mantle layer 14 and a cover 16.

Figure 19:
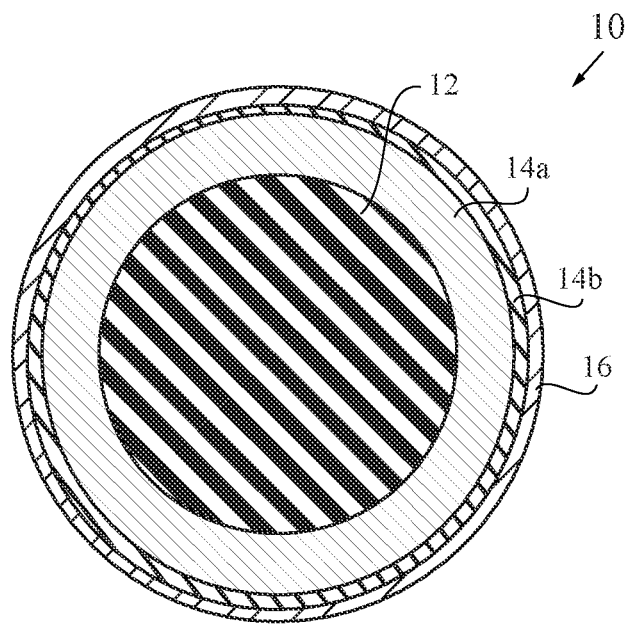
FIG. 19 is a cross-sectional view of a four-piece golf ball with a core, dual mantle layers and a cover.

FIG. 19 illustrates a four piece golf ball 10 comprising a core 12, an inner mantle 14a, an outer mantle 14b and a cover 16.

In a preferred embodiment, the cover is preferably composed of a thermoplastic polyurethane material, and preferably has a thickness ranging from 0.025 inch to 0.04 inch, and more preferably ranging from 0.03 inch to 0.04 inch. The material of the cover preferably has a Shore D plaque hardness ranging from 30 to 60, and more preferably from 40 to 50. The Shore D hardness measured on the cover is preferably less than 56 Shore D. Preferably the cover 16 has a Shore A hardness of less than 96. Alternatively, the cover 16 is composed of a thermoplastic polyurethane/polyurea material. One example is disclosed in U.S. Pat. No. 7,367,903 for a Golf Ball, which is hereby incorporated by reference in its entirety. Another example is Melanson, U.S. Pat. No. 7,641,841, which is hereby incorporated by reference in its entirety. Another example is Melanson et al, U.S. Pat. No. 7,842,211, which is hereby incorporated by reference in its entirety. Another example is Matroni et al., U.S. Pat. No. 7,867,111, which is hereby incorporated by reference in its entirety. Another example is Dewanjee et al., U.S. Pat. No. 7,785,522, which is hereby incorporated by reference in its entirety.

Still yet in another alternative embodiment, the cover is composed of a reaction injection molded polyurethane such as disclosed in Kennedy III et al., U.S. Pat. No. 6,290,614 which is hereby incorporated by reference in its entirety, or Kennedy III et al., U.S. Pat. No. 7,208,562 which is hereby incorporated by reference in its entirety.

Still yet in another alternative embodiment, the cover is composed of thermosetting polyurethane material such as disclosed in Dewanjee, U.S. Pat. No. 6,511,388 which is hereby incorporated by reference in its entirety, or Dewanjee, U.S. Pat. No. 6,762,273 which is hereby incorporated by reference in its entirety.

Still yet in another alternative embodiment, the cover is composed of an ionomer material such as disclosed in Sullivan, U.S. Pat. No. 6,800,695 which is hereby incorporated by reference in its entirety.

The mantle component is preferably composed of the inner mantle layer and the outer mantle layer. The mantle component preferably has a thickness ranging from 0.05 inch to 0.15 inch, and more preferably from 0.06 inch to 0.08 inch. The outer mantle layer is preferably composed of a blend of ionomer materials. One preferred embodiment comprises SURLYN 9150 material, SURLYN 8940 material, a SURLYN AD1022 material, and a masterbatch. The SURLYN 9150 material is preferably present in an amount ranging from 20 to 45 weight percent of the cover, and more preferably 30 to 40 weight percent. The SURLYN 8945 is preferably present in an amount ranging from 15 to 35 weight percent of the cover, more preferably 20 to 30 weight percent, and most preferably 26 weight percent. The SURLYN 9945 is preferably present in an amount ranging from 30 to 50 weight percent of the cover, more preferably 35 to 45 weight percent, and most preferably 41 weight percent. The SURLYN 8940 is preferably present in an amount ranging from 5 to 15 weight percent of the cover, more preferably 7 to 12 weight percent, and most preferably 10 weight percent.

SURLYN 8320, from DuPont, is a very-low modulus ethylene/methacrylic acid copolymer with partial neutralization of the acid groups with sodium ions. SURLYN 8945, also from DuPont, is a high acid ethylene/methacrylic acid copolymer with partial neutralization of the acid groups with sodium ions. SURLYN 9945, also from DuPont, is a high acid ethylene/methacrylic acid copolymer with partial neutralization of the acid groups with zinc ions. SURLYN 8940, also from DuPont, is an ethylene/methacrylic acid copolymer with partial neutralization of the acid groups with sodium ions.

The inner mantle layer is preferably composed of a blend of ionomers, preferably comprising a terpolymer and at least two high acid (greater than 18 weight percent) ionomers neutralized with sodium, zinc, magnesium, or other metal ions. The material for the inner mantle layer preferably has a Shore D plaque hardness ranging preferably from 35 to 77, more preferably from 36 to 44, a most preferably approximately 40. The thickness of the outer mantle layer preferably ranges from 0.025 inch to 0.050 inch, and is more preferably approximately 0.037 inch. The mass of an insert including the dual core and the inner mantle layer preferably ranges from 32 grams to 40 grams, more preferably from 34 to 38 grams, and is most preferably approximately 36 grams. The inner mantle layer is alternatively composed of a HPF material available from DuPont. Alternatively, the inner mantle layer 14b is composed of a material such as disclosed in Kennedy, III et al., U.S. Pat. No. 7,361,101 for a Golf Ball And Thermoplastic Material, which is hereby incorporated by reference in its entirety.

The outer mantle layer is preferably composed of a blend of ionomers, preferably comprising at least two high acid (greater than 18 weight percent) ionomers neutralized with sodium, zinc, or other metal ions. The blend of ionomers also preferably includes a masterbatch. The material of the outer mantle layer preferably has a Shore D plaque hardness ranging preferably from 55 to 75, more preferably from 65 to 71, and most preferably approximately 67. The thickness of the outer mantle layer preferably ranges from 0.025 inch to 0.040 inch, and is more preferably approximately 0.030 inch. The mass of the entire insert including the core, the inner mantle layer and the outer mantle layer preferably ranges from 38 grams to 43 grams, more preferably from 39 to 41 grams, and is most preferably approximately 41 grams.

In an alternative embodiment, the inner mantle layer is preferably composed of a blend of ionomers, preferably comprising at least two high acid (greater than 18 weight percent) ionomers neutralized with sodium, zinc, or other metal ions. The blend of ionomers also preferably includes a masterbatch. In this embodiment, the material of the inner mantle layer has a Shore D plaque hardness ranging preferably from 55 to 75, more preferably from 65 to 71, and most preferably approximately 67. The thickness of the outer mantle layer preferably ranges from 0.025 inch to 0.040 inch, and is more preferably approximately 0.030 inch. Also in this embodiment, the outer mantle layer 14b is composed of a blend of ionomers, preferably comprising a terpolymer and at least two high acid (greater than 18 weight percent) ionomers neutralized with sodium, zinc, magnesium, or other metal ions. In this embodiment, the material for the outer mantle layer 14b preferably has a Shore D plaque hardness ranging preferably from 35 to 77, more preferably from 36 to 44, a most preferably approximately 40. The thickness of the outer mantle layer preferably ranges from 0.025 inch to 0.100 inch, and more preferably ranges from 0.070 inch to 0.090 inch.

In yet another embodiment wherein the inner mantle layer is thicker than the outer mantle layer and the outer mantle layer is harder than the inner mantle layer, the inner mantle layer is composed of a blend of ionomers, preferably comprising a terpolymer and at least two high acid (greater than 18 weight percent) ionomers neutralized with sodium, zinc, magnesium, or other metal ions. In this embodiment, the material for the inner mantle layer has a Shore D plaque hardness ranging preferably from 30 to 77, more preferably from 30 to 50, and most preferably approximately 40. In this embodiment, the material for the outer mantle layer has a Shore D plaque hardness ranging preferably from 40 to 77, more preferably from 50 to 71, and most preferably approximately 67. In this embodiment, the thickness of the inner mantle layer preferably ranges from 0.030 inch to 0.090 inch, and the thickness of the outer mantle layer ranges from 0.025 inch to 0.070 inch.

Preferably the inner core has a diameter ranging from 0.75 inch to 1.20 inches, more preferably from 0.85 inch to 1.05 inch, and most preferably approximately 0.95 inch. Preferably the inner core 12a has a Shore D hardness ranging from 20 to 50, more preferably from 25 to 40, and most preferably approximately 35. Preferably the inner core is formed from a polybutadiene, zinc diacrylate, zinc oxide, zinc stearate, a peptizer and peroxide. Preferably the inner core has a mass ranging from 5 grams to 15 grams, 7 grams to 10 grams and most preferably approximately 8 grams.

Preferably the outer core has a diameter ranging from 1.25 inch to 1.55 inches, more preferably from 1.40 inch to 1.5 inch, and most preferably approximately 1.5 inch. Preferably the inner core has a Shore D surface hardness ranging from 40 to 65, more preferably from 50 to 60, and most preferably approximately 56. Preferably the inner core is formed from a polybutadiene, zinc diacrylate, zinc oxide, zinc stearate, a peptizer and peroxide. Preferably the combined inner core and outer core have a mass ranging from 25 grams to 35 grams, 30 grams to 34 grams and most preferably approximately 32 grams.

Figure 6:
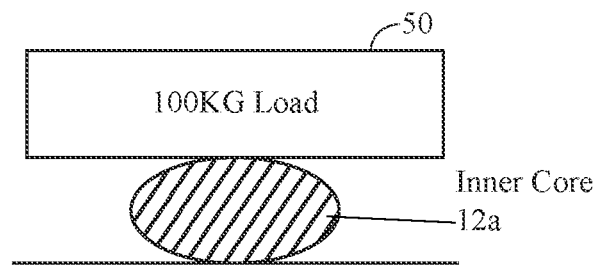
FIG. 6 is a cross-sectional view of an inner core layer under a 100 kilogram load.
Figure 7:
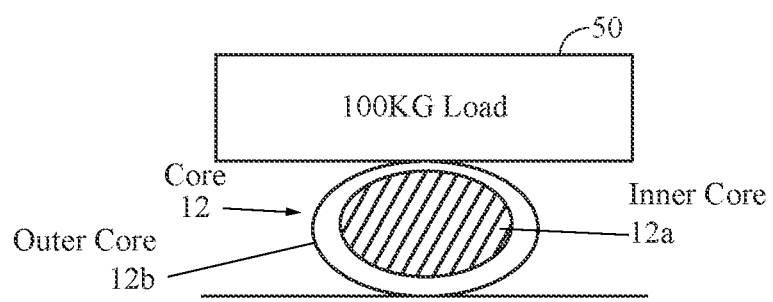
FIG. 7 is a cross-sectional view of a core under a 100 kilogram load.

Preferably the inner core has a deflection of at least 0.230 inch under a load of 220 pounds, and the core has a deflection of at least 0.080 inch under a load of 200 pounds. As shown in FIGS. 6 and 7, a mass 50 is loaded onto an inner core and a core. As shown in FIGS. 6 and 7, the mass is 100 kilograms, approximately 220 pounds. Under a load of 100 kilograms, the inner core preferably has a deflection from 0.230 inch to 0.300 inch. Under a load of 100 kilograms, preferably the core has a deflection of 0.08 inch to 0.150 inch. Alternatively, the load is 200 pounds (approximately 90 kilograms), and the deflection of the core 12 is at least 0.080 inch. Further, a compressive deformation from a beginning load of 10 kilograms to an ending load of 130 kilograms for the inner core ranges from 4 millimeters to 7 millimeters and more preferably from 5 millimeters to 6.5 millimeters. The dual core deflection differential allows for low spin off the tee to provide greater distance, and high spin on approach shots.

In an alternative embodiment of the golf ball shown in FIG. 5A, the golf ball 10 comprises an inner core 12a, an intermediate core 12b, an outer core 12b, a mantle 14 and a cover 16. The golf ball 10 preferably has a diameter of at least 1.68 inches, a mass ranging from 45 grams to 47 grams, a COR of at least 0.79, a deformation under a 100 kilogram loading of at least 0.07 mm.

In one embodiment, the golf ball comprises a core, a mantle layer and a cover layer. The core comprises an inner core sphere, an intermediate core layer and an outer core layer. The inner core sphere comprises a polybutadiene material and has a diameter ranging from 0.875 inch to 1.4 inches. The intermediate core layer is composed of a highly neutralized ionomer and has a Shore D hardness less than 40. The outer core layer is composed of a highly neutralized ionomer and has a Shore D hardness less than 45. A thickness of the intermediate core layer is greater than a thickness of the outer core layer. The mantle layer is disposed over the core, comprises an ionomer material and has a Shore D hardness greater than 55. The cover layer is disposed over the mantle layer comprises a thermoplastic polyurethane material and has a Shore A hardness less than 100. The golf ball has a diameter of at least 1.68 inches. The mantle layer is harder than the outer core layer, the outer core layer is harder than the intermediate core layer, the intermediate core layer is harder than the inner core sphere, and the cover layer is softer than the mantle layer.

In another embodiment, shown in FIGS. 8 and 9, the golf ball 10 has a multi-layer core and multi-layer mantle. The golf ball includes a core, a mantle component and a cover layer. The core comprises an inner core sphere, an intermediate core layer and an outer core layer. The inner core sphere comprises a polybutadiene material and has a diameter ranging from 0.875 inch to 1.4 inches. The intermediate core layer is composed of a highly neutralized ionomer and has a Shore D hardness less than 40. The outer core layer is composed of a highly neutralized ionomer and has a Shore D hardness less than 45. A thickness of the intermediate core layer is greater than a thickness of the outer core layer. The inner mantle layer is disposed over the core, comprises an ionomer material and has a Shore D hardness greater than 55. The outer mantle layer is disposed over the inner mantle layer, comprises an ionomer material and has a Shore D hardness greater than 60. The cover layer is disposed over the mantle component, comprises a thermoplastic polyurethane material and has a Shore A hardness less than 100. The golf ball has a diameter of at least 1.68 inches. The mantle layer is harder than the inner mantle layer, the inner mantle layer is harder than the outer core layer, the outer core layer is harder than the intermediate core layer, the intermediate core layer is harder than the inner core sphere, and the cover layer is softer than the outer mantle layer.

In a particularly preferred embodiment of the invention, the golf ball preferably has an aerodynamic pattern such as disclosed in Simonds et al., U.S. Pat. No. 7,419,443 for a Low Volume Cover For A Golf Ball, which is hereby incorporated by reference in its entirety. Alternatively, the golf ball has an aerodynamic pattern such as disclosed in Simonds et al., U.S. Pat. No. 7,338,392 for An Aerodynamic Surface Geometry For A Golf Ball, which is hereby incorporated by reference in its entirety.

Various aspects of the present invention golf balls have been described in terms of certain tests or measuring procedures. These are described in greater detail as follows.

As used herein, "Shore D hardness" of the golf ball layers is measured generally in accordance with ASTM D-2240 type D, except the measurements may be made on the curved surface of a component of the golf ball, rather than on a plaque. If measured on the ball, the measurement will indicate that the measurement was made on the ball. In referring to a hardness of a material of a layer of the golf ball, the measurement will be made on a plaque in accordance with ASTM D-2240. Furthermore, the Shore D hardness of the cover is measured while the cover remains over the mantles and cores. When a hardness measurement is made on the golf ball, the Shore D hardness is preferably measured at a land area of the cover.

As used herein, "Shore A hardness" of a cover is measured generally in accordance with ASTM D-2240 type A, except the measurements may be made on the curved surface of a component of the golf ball, rather than on a plaque. If measured on the ball, the measurement will indicate that the measurement was made on the ball. In referring to a hardness of a material of a layer of the golf ball, the measurement will be made on a plaque in accordance with ASTM D-2240. Furthermore, the Shore A hardness of the cover is measured while the cover remains over the mantles and cores. When a hardness measurement is made on the golf ball, Shore A hardness is preferably measured at a land area of the cover The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head speed, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the COR and the surface configuration of the ball.

The coefficient of restitution is the ratio of the outgoing velocity to the incoming velocity. In the examples of this application, the coefficient of restitution of a golf ball was measured by propelling a ball horizontally at a speed of 125+/−5 feet per second (fps) and corrected to 125 fps against a generally vertical, hard, flat steel plate and measuring the ball's incoming and outgoing velocity electronically. Speeds were measured with a pair of ballistic screens, which provide a timing pulse when an object passes through them. The screens were separated by 36 inches and are located 25.25 inches and 61.25 inches from the rebound wall. The ball speed was measured by timing the pulses from screen 1 to screen 2 on the way into the rebound wall (as the average speed of the ball over 36 inches), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The measurements for deflection, compression, hardness, and the like are preferably performed on a finished golf ball as opposed to performing the measurement on each layer during manufacturing.

Preferably, in a five layer golf ball comprising an inner core, an outer core, an inner mantle layer, an outer mantle layer and a cover, the hardness/compression of layers involve an inner core with the greatest deflection (lowest hardness), an outer core (combined with the inner core) with a deflection less than the inner core, an inner mantle layer with a hardness less than the hardness of the combined outer core and inner core, an outer mantle layer with the hardness layer of the golf ball, and a cover with a hardness less than the hardness of the outer mantle layer. These measurements are preferably made on a finished golf ball that has been torn down for the measurements.

Preferably the inner mantle layer is thicker than the outer mantle layer or the cover layer. The dual core and dual mantle golf ball creates an optimized velocity-initial velocity ratio (Vi/IV), and allows for spin manipulation. The dual core provides for increased core compression differential resulting in a high spin for short game shots and a low spin for driver shots. A discussion of the USGA initial velocity test is disclosed in Yagley et al., U.S. Pat. No. 6,595,872 for a Golf Ball With High Coefficient Of Restitution, which is hereby incorporated by reference in its entirety. Another example is Bartels et al., U.S. Pat. No. 6,648,775 for a Golf Ball With High Coefficient Of Restitution, which is hereby incorporated by reference in its entirety.

Chavan et al., U.S. patent Ser. No. 10/722,755, for a Graphene Based Golf Ball Coating, is hereby incorporated by reference in its entirety.

Chavan et al., U.S. Pat. No. 9,962,577, for a Soft Polyurethane Coating For A Golf Ball, is hereby incorporated by reference in its entirety.

Bartels, U.S. Pat. No. 9,278,260, for a Low Compression Three-Piece Golf Ball With An Aerodynamic Drag Rise At High Speeds, is hereby incorporated by reference in its entirety.

Chavan et al, U.S. Pat. No. 9,789,366, for a Graphene Core For A Golf Ball, is hereby incorporated by reference in its entirety.

Chavan et al, U.S. patent application Ser. No. 15/705,011, filed on Sep. 14, 2017, for a Graphene Core For A Golf Ball, is hereby incorporated by reference in its entirety.

Chavan et al., U.S. patent application Ser. No. 15/729,231, filed on Oct. 10, 2017, for a Graphene And Nanotube Reinforced Golf Ball, is hereby incorporated by reference in its entirety.

Brown, U.S. patent application Ser. No. 15/683,398, filed on Aug. 22, 2017, for a Golf Ball With Improved Durability, is hereby incorporated by reference in its entirety.

Petrich et al., U.S. patent Ser. No. 10/252,114 for a Graphene Core For A Golf Ball With A Soft Cover, is hereby incorporated by reference in its entirety.

Petrich et al., U.S. patent Ser. No. 10/695,616 for a Graphene Core For A Golf Ball With A Soft Cover, is hereby incorporated by reference in its entirety.

Crast et al., U.S. Pat. No. 6,632,877, for a Dual Curable Coating, is hereby incorporated by reference in its entirety.

Skrabski et al., U.S. Pat. No. 6,544,337, for a Golf Ball Painting System, is hereby incorporated by reference in its entirety.

Crast et al., U.S. Pat. No. 6,365,679, for a Two component polyurethane clear coat for golf balls, is hereby incorporated by reference in its entirety.

Crast et al., U.S. Pat. No. 6,165,564, for a UV Clearable Clear Coat For Golf Balls, is hereby incorporated by reference in its entirety.

Skrabski et al., U.S. Pat. No. 6,319,563, for a Golf ball Painting Method, is hereby incorporated by reference in its entirety.

Matroni et al., U.S. Pat. No. 7,485,052, for a Golf Ball, is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A golf ball comprising:
   a core;
   a cover layer disposed over the core;
   a coating disposed over the cover layer, the coating comprising an one-component polyurethane dispersion (PUD)
   wherein the coating has an elongation of at least 400 percent;
   wherein the PUD consist of 20% to 40% weight solids dispersions of polyurethane-filled micelles in a continuous water phase.

2. The golf ball according to claim 1 wherein the cover layer is composed of an ionomer material.

3. The golf ball according to claim 1 wherein the weight solid dispersions has a particle of size of no more than 0.0642 microns.

4. The golf ball according to claim 1 wherein the coating is water based.

5. A golf ball comprising:
   a core;
   a cover layer disposed over the core;

a coating disposed over the cover layer, the coating comprising an one-component polyurethane dispersion (PUD), wherein the coating has an elongation of at least 400 percent;

wherein the coating has a viscosity of at least 200 cp.

6. A golf ball comprising:
a core;
a cover layer disposed over the core;
a coating disposed over the cover layer, the coating comprising an one-component polyurethane dispersion (PUD), wherein the coating has an elongation of at least 400 percent;

wherein the coating is a primer layer.

7. A golf ball comprising:
a core;
a cover layer disposed over the core;
a coating disposed over the cover layer, the coating comprising an one-component polyurethane dispersion (PUD), wherein the coating has an elongation of at least 400 percent;
a base coat; and
a top coat.

8. A golf ball comprising:
a core;
a cover layer disposed over the core;
a coating disposed over the cover layer, the coating comprising an one-component polyurethane dispersion (PUD), wherein the coating has an elongation of at least 400 percent;

wherein the coating is solvent based.

9. A golf ball comprising:
a core;
a cover layer disposed over the core;
a coating disposed over the cover layer, the coating comprising an one-component polyurethane dispersion (PUD), wherein the coating has an elongation of at least 400 percent;

wherein the coating has six layers.

10. A golf ball comprising:
a core;
a mantle layer;
a cover layer disposed over the mantle layer;
a coating disposed over the cover layer, the coating comprising an one-component polyurethane dispersion (PUD)

wherein the coating has an elongation of at least 400 percent;

wherein the PUD consist of 20% to 40% weight solids dispersions of polyurethane-filled micelles in a continuous water phase.

11. The golf ball according to claim 10 wherein the cover layer is composed of an ionomer material.

12. The golf ball according to claim 10 wherein the coating has a viscosity of at least 200 cp.

13. The golf ball according to claim 10 wherein the coating is a primer layer.

14. The golf ball according to claim 1 wherein further comprising a base coat and a top coat.

15. The golf ball according to claim 10 wherein the coating is water based or solvent based.

16. The golf ball according to claim 10 wherein the coating has six layers.

17. A golf ball comprising:
a core;
a mantle layer;
a cover layer disposed over the mantle layer;
a coating disposed over the cover layer, the coating comprising an one-component polyurethane dispersion (PUD), wherein the coating has an elongation of at least 400 percent;

wherein the weight solid dispersions has a particle of size of no more than 0.0642 microns.

18. A coating for a golf ball, the coating comprising:
an one-component polyurethane dispersion (PUD);
wherein the coating has an elongation of at least 400 percent;
wherein the PUD consist of 20% to 40% weight solids dispersions of polyurethane-filled micelles in a continuous water phase;
wherein the weight solid dispersions has a particle of size of no more than 0.0642 microns;
wherein the coating has a viscosity of at least 200 cp.

* * * * *